US008181604B1

(12) United States Patent  (10) Patent No.: US 8,181,604 B1
Avila  (45) Date of Patent: May 22, 2012

(54) BARN SYSTEM FOR HOUSING FARM ANIMALS

(76) Inventor: David Avila, Modesto, CA (US)

( * ) Notice: Subject to any disclaimer, the term of this patent is extended or adjusted under 35 U.S.C. 154(b) by 601 days.

(21) Appl. No.: 12/125,513

(22) Filed: May 22, 2008

Related U.S. Application Data (60) Provisional application No. 60/931,269, filed on May 22, 2007, provisional application No. 60/839,059, filed on May 22, 2007.

(51) Int. Cl.
*A01K 1/00* (2006.01)
(52) U.S. Cl. .......................................................... 119/448
(58) Field of Classification Search .................. 119/448, 119/436, 493, 500
See application file for complete search history.

(56) References Cited

U.S. PATENT DOCUMENTS

| | | | | |
|---|---|---|---|---|
| 4,773,191 A | * | 9/1988 | Slack ................................. | 52/63 |
| 4,773,471 A | * | 9/1988 | Grant et al. ...................... | 165/60 |
| 4,986,469 A | * | 1/1991 | Sutton, Jr. ....................... | 236/49.3 |
| 5,458,537 A | * | 10/1995 | Crider et al. .................. | 454/256 |
| 5,492,082 A | * | 2/1996 | Krevinghaus et al. ........ | 119/448 |
| 6,675,739 B2 | * | 1/2004 | Terrell et al. .................. | 119/448 |
| 7,536,976 B1 | * | 5/2009 | Bryant .......................... | 119/448 |

FOREIGN PATENT DOCUMENTS

EP 351310 A2 * 1/1990

* cited by examiner

*Primary Examiner* — Kristen C Hayes
(74) *Attorney, Agent, or Firm* — Richard S Erbe

(57) ABSTRACT

A barn system that enables control of the environment inside a closed barn utilizes banks of fans mounted in the opposing side walls of the barn and interior circulation fans in conjunction with misters to maintain the comfort of animals confined in the barn, in particular, milk cows. The interior circulation fans are of the oscillating type that can sweep in a horizontal arc to help the circulation of the air. Movable curtains in the side walls may be raised and lowered to allow for natural ventilation of the barn when outside conditions allow. A number of exhaust fans mounted on the roof ridge line provides for exhaust of the air out the roof, as opposed to the sides as in conventional barns. The fans, misters, operable ridge vents, exhaust fans and curtains are controlled by a central monitoring and control system. A scrubber system for removing VOC's in the exhaust air may be included. The barn system may also be equipped with a system to remove VOC's from the scrubber water to recycle water back for repeated use in the scrubber system.

10 Claims, 12 Drawing Sheets

BARN SYSTEM FOR HOUSING FARM ANIMALS

RELATED APPLICATIONS

This application claims the benefit of U.S. Provisional Patent Application No. 60/931,269 filed May 22, 2007, and U.S. Provisional Patent Application No. 60/839,059 filed May 22, 2007, both of which are incorporated herein in their entireties.

BACKGROUND OF THE INVENTION

1. Field of the Invention

The present invention relates to the field of farming; more particularly, the present invention relates to a barn system that provides control of the environment inside a closed barn by monitoring conditions both inside and outside of the barn to provide complete animal comfort, in particular to milk cows, with evaporative cooling and improved heat concentration in the winter.

2. General Background and State of the Art

Farm animals, particularly milk cows, confined in a confined environment, are greatly affected by the conditions in the confined environment or barn. If the animals become stressed, the cows will produce less milk. Constant stress on the cows not only means less milk production, but it can also shorten their lives. A female calf takes approximately 24 months from birth to calving the first time, which brings her into her first milking (lactating) cycle. At that point, she is called a "first calf heifer." She can be milked for 305 days and "dried" off (not producing milk for two months while she is in her last months of gestation, which uses a lot of energy maturing the calf inside of her). After the dry period, she calves again and is now in her second lactation. The cycle continues until something occurs which makes her an expense rather than an asset. This something is usually feet, leg, or udder disease problems. At this point, she is "culled" from the herd. The "cull rate" in California, for example, is 2.7 lactations, which makes the cow approximately 4.7 years old. She will have produced two or possibly three calves at that point. If the level of comfort for confined cows could be improved so that the cow's useful lifespan could increase by one year that would mean another year of milk production to the owner and probably an additional offspring, thus increasing the profitability of the owner's herd.

While the temperature and humidity in the barn affect the cow's comfort, another factor that can cause stress in a cow is the absence of light. Ideally, a cow confined in a barn should have about 18 hours of light and six hours of dark in a day. Many barns of known designs are dark, and so artificial lighting must be provided, thus raising the cost of power to the owner.

It is also known that for a milk producing cow in a confined barn that the cow should spend about four to six sessions of twenty minutes a day eating, followed by a period of walking around. For the most part, to maximize comfort for a cow, the cow should lie down much of the day. Any conditions in the barn that make the cow want to stand around and not lie down can impact the quality of life, milk production, and reproduction capability of the cow. Thus, control of the conditions inside a barn must be optimized for the comfort of the cows.

Conventional cooling livestock barns are generally of the "tunnel-ventilated" design. Such barns generally have a bank of fans mounted to the wall at one end of the barn that pull stale air from the barn and exhaust it to the atmosphere. As the stale air is pulled from the barn, fresh outside air is pulled into the barn through the opposite wall of the barn through evaporative pads, thereby adding moisture to the fresh incoming air and carrying the moisture into the interior of the barn. The inherent problem with such tunnel-ventilated barns is that the fresh air traveling through the evaporative pads absorbs water at an uncontrolled rate, which makes the effect of the "wet" air in the barn unpredictable and inconsistent, and thus making control of the humidity in the barn virtually impossible. Such designs can cause a great deal of stress to the livestock in the barn in the situation where the humidity is at an undesirable level.

Another conventional cooling barn design is the so-called "cross-ventilated" barn. A cross-ventilated barn is similar to a tunnel-ventilated barn, in the respect that the bank of fans on one wall of the barn exhausts stale inside air from the barn while fresh outside air is pulled through evaporative pads set on the opposite wall of the barn. However, in the cross-ventilated barn design, the exhaust fans and evaporative pads are set into the side walls of the barn, while in the tunnel-ventilated design, the fans and evaporative pads are set into the end walls of the barn. The side walls in these barns are closer to each other than are the end walls of the barn. Cross-ventilated barns are generally better than tunnel-ventilated barns, because the air inside the cross-ventilated barn tends to remain cleaner from contaminants because it travels a shorter distance through the barn. However, cross-ventilated barns tend to suffer from a different ventilation problem, namely, that the same amount of air traveling through the much larger surface of the side of the building, rather than through the much smaller surface area of the end of the building slows the airspeed considerably. This reduction in airspeed severely reduces the capacity of the air to remove water vapor from the cows, which is an important feature in maintaining the comfort level of the cows.

Conventional barns usually include misting or wetting devices to wet the cows when then are at their eating positions (barns generally have two distinctive cow feeding lanes near the long centerline of the barn). Under certain conditions, being positioned near such devices may be the most comfortable position for the cow. However, for the quality of life of the cows, standing in one place for prolonged periods of time is not healthy, and it may be that other cows will be denied access to the feeding lanes, causing further stress to the animals. Such a situation would mean that many of the cows could be left standing for prolonged periods of time, thus causing additional stress on the animals, which will likely result in lowered production of milk from the cows.

None of the conventional design of air distribution and air quality systems in barns includes controls that are impacted by conditions outside of the barn, such as outside temperature, outside relative humidity, wind direction, or wind velocity.

The conventional tunnel-ventilated and cross-ventilated barns also suffer from problems associated with resistance from headwinds on the outside of the barn. Depending on the direction and force of such headwinds, the ability to draw fresh outside air into the barn may be substantially reduced.

In conventional designs of barns, all of the air inside the barn must be cooled to avoid stratification and allow the air to be drawn out of the barn.

Recently, in some states, such as California, air quality standards for emissions from barns have become more stringent, thus requiring many owners of barns to install a means of cleaning the air that is exhausted from the barn.

It would be desirable, therefore, to provide a novel barn system for controlling the environment inside a closed barn that responds to conditions both inside and outside of the barn.

It would also be desirable to provide a novel barn system for controlling the environment inside a closed barn that provides a uniform circulation pattern of the air flowing in the barn that encourages the cows to follow their normal and desired patterns of eating, moving about, and laying down.

It would also be desirable to provide a novel barn system for controlling the environment inside a closed barn that avoids the problems associated with outside headwinds that are known to exist with conventional barn system designs.

SUMMARY OF THE INVENTION

It is therefore an object of the present invention to provide a barn system that enables control of the environment inside a closed barn that optimizes air flow inside the barn.

It is another object of the present invention to provide a barn system that enables control of the environment inside a closed barn that optimizes the comfort level of the livestock in the barn.

A further object of the present invention is to provide a barn system that enables control of the environment inside a closed barn that is based on conditions of both inside air and outside air.

Yet another object of the present invention is to provide a barn system that enables control of the environment inside a closed barn that minimizes the length of travel of the air flowing through the barn, thus improving the quality of the air.

Another object of the present invention is to provide a barn system that enables control of the environment inside a closed barn that provides evaporative cooling during the summer months and improved heat concentration during the winter months.

Still another object of the present invention is to provide a barn system that enables control of the environment inside a closed barn the exhausts air through the roof of the barn, rather than through the side or end walls, thus mitigating problems from headwinds.

A further object of the present invention is to provide a barn system that enables control of the environment inside a closed barn that does not require the use of evaporative pads Yet another object of the present invention is to provide a barn system that enables control of the environment inside a closed barn that also provides a means to clean the air that is exhausted from the barn.

These and other objectives are achieved and the problems associated with known barn system designs are overcome in accordance with an exemplary barn system embodying the principles of the invention, wherein banks of fans on both side walls blow outside air into the barn, rather than pulling air through the barn. Interior circulation fans, which are preferably of the oscillating type that allows them to be rotated horizontally through an arc, are arranged inside the barn along the cow feeding lanes and work in conjunction with the side wall fans. This feature is in stark contrast to the fans of the conventional barn designs, which are fixed. The internal circulation fans circulate air around the bedding area of the barn, as well as at the feeding lanes, and are controlled and timed according to the feeding cycle as well as with other factors. It should be noted that the number of side wall and interior circulation fans may vary depending on the design parameters and the location of the barn. The barn system according to the principles of the present invention includes an internal misting system, rather than evaporative pads as in conventional barn system designs, to provide the proper amount of moisture to control humidity and wet the cows for cooling.

The side wall fans each use a mister in conjunction with evaporation tubes. Each evaporation tube is mounted over a side wall fan shroud, which directs air flow down the inside of the tube. The misters are mounted in the evaporation tube within the air flow. This configuration allows maximum air to mist contact time, which enhances evaporation. The evaporation tube is perforated with a number of openings which direct wet air down over the cows. This configuration solves a problem of the mist settling down to the bedding and getting it wet, which is a big problem.

The barn system in accordance with the present invention also includes rows of curtains arrayed along the side walls that may be raised and lowered by a motorized chain-drive system on each side wall to regulate the air intake into the barn in order to optimize the condition of the air in the barn and provide natural ventilation when outside conditions allow. The number of curtains may vary depending on the design parameters and the location of the barn, and some of the side wall curtains will include openings to accommodate the side wall fans.

The barn system in accordance with the present invention includes an active ridge ventilation system, wherein air is exhausted from the barn through the ridge of the roof of the barn instead of out of one of the walls. This design of the ventilation system mitigates the problems encountered by conventional barn designs due to headwind resistance. The ridge ventilation design also improves the quality of the air flowing inside the barn because the fresh outside air entering the barn travels across only one-half of the barn before it is exhausted from the barn. Consequently, the air that comes in contact with the livestock has fewer contaminants than in conventional barn designs.

In the barn system in accordance with the present invention, the natural air flow within the barn naturally tends to rise and concentrate at the ridge of the barn. By locating exhaust fans at the ridge in the barn system in accordance with the present invention, the "worst air" in the building is always being removed from the barn.

Alternatively, because of the positive pressure provided to the air in the barn by the side wall fans and the interior circulation fans, an updraft fan design or positive pressure design barn may be created, and stale air from the barn may be exhausted from the barn using passive ridge vents at a number of locations along the roof ridge.

The activation of side wall fans, interior circulation fans, misters, operable ridge vents, exhaust fans, and curtains are controlled by a monitoring and control system that includes a programmable logic controller that monitors and controls the conditions of the air inside the barn. The monitoring and control system monitors conditions inside and outside of the barn as well. In the preferred embodiment of the present invention, a weather station located outside the barn provides data to the monitoring and control system such as outside wind direction and velocity, outside air temperature, and outside air relative humidity.

The monitoring and control system in accordance with the preferred embodiment of the invention accounts for many parameters and based on them, selectively turns on and off some or all of the side wall fans, the misters, and the interior circulation fans. The misters are separately controlled by the monitoring and control system. The monitoring and control system also selectively raises and lowers the side wall curtains and opens or closes the operable ridge vents according to preprogrammed logic to adjust the flow of outside air entering the barn.

Other factors that are part of the control logic include the feeding cycle time, the number of cows in the barn, as each one provides some body heat to the air as well as by vapor expelled by the cows. Evaporation from water troughs, evaporation from manure, and evaporation from the composting bedding that may be included in a barn system in accordance with the present invention are also factors that impact the environmental conditions inside the barn.

Conventional barn system designs are not energy efficient in that they are designed to cool all of the air volume in the barn. The use of misters in the barn system in accordance with the present invention is more energy efficient in that the system is designed to cool only the lower strata of air inside the barn (approximately from floor to fourteen feet above the floor). With this design, the uncooled and warmer air in the upper strata of the barn is not problematic, as it actually causes a positive "convection" air flow up to the ridge of the barn roof, where it can be exhausted, instead of having to be cooled. Such a design can result in substantial energy cost savings.

The use of misters means that in the barn system according to the present invention, no evaporative pads need to be used. The air is misted when it enters the barn as well as when it travels through the barn. The ratio of air is modulated with the volume of mist by the monitoring and control system, based on the ability of the air to absorb the water vapor. The amount of water vapor that is introduced into the barn is in turn based on the amount of water vapor needed to absorb the heat in the barn. With the barn system in accordance with the principles of the present invention, the running time for the fans and misting equipment is reduced, which thus reduces electrical usage, thereby making the barn system according to the present invention more economical to operate than conventional tunnel-ventilated and cross-ventilated barns.

The interior circulation fans are not only designed to rotate through a horizontal arc but they may also be configured in such a way as provide the system in accordance with the present invention to operate in different modes in summer and winter. More particularly, the interior circulation fans can be set with a slight downward tilt (5 to 10 degrees), in order to direct air more toward the animals during the summer for more direct cooling. During winter operations, the interior circulation fans can be set with a slight upward tilt (5 to 10 degrees) in order to help circulate the upper air downward and bring the warm upper air to the floor of the barn. This upward tilt also helps to reduce condensation on the roof of the barn.

The side curtains and the roof of the barn system according to the present invention are preferably constructed of polyethylene fabric that reflects more heat than a conventional metal building material while allowing infiltration of natural light into the barn interior to provide a healthier environment.

As mentioned previously, more stringent standards have recently been applied to emissions from barns. Barns housing livestock are known for emissions of volatile organic compounds (VOC's). Many jurisdictions now mandate reductions in emissions of VOC's from barns.

To meet such mandates, the barn system according to the principles of the present invention may also be provided with a ridge vent scrubber installed on the underside of the ridge of the barn roof. This scrubber adds a sprinkling system, and a media to hold the sprayed water, to provide a permeable "wet" surface for the exhaust air to travel through as the ridge exhaust fans pull (or push, as in case with the positive pressure design) the air up and out of the barn through the ridge vents.

The barn system according to the present invention may also be provided with a catch pan made of polyethylene fabric membrane which will catch the water from the ridge vent sprinkling system as the water flows through the media. This fabric pan collects the contaminated water and conveys it to a reservoir, where it is inoculated with speciated bacteria that have the ability to consume the VOC's as food. This process removes the VOC's from the water, which then can be recycled back to the ridge vent scrubber to the sprinkling system.

The barn system in accordance with the principles of the present invention also may be constructed and installed in unique and novel ways. The barn components are designed to be assembled at ground level and the pulled and lifted into their erected positions. This procedure allows for much labor savings in construction, mainly due to the fact that most of the assembly is done at grade and not at the finished roof elevation, which typically is much higher.

Further objects and advantages of this invention will become more apparent from the following description of the preferred embodiment, which, taken in conjunction with the accompanying drawings, will illustrate, by way of example, the principles of the invention.

BRIEF DESCRIPTION OF THE DRAWINGS

The foregoing and other aspects and advantages will be better understood from the following detailed description of the preferred embodiments of the invention with reference to the drawings in which.

DETAILED DESCRIPTION OF THE PREFERRED EMBODIMENT OF THE INVENTION

In the following description of the invention, reference is made to the accompanying drawings, which form a part thereof, and in which is shown, by way of illustration, an exemplary embodiment illustrating the principles of the barn system of the present invention and how it may be practiced. It is to be understood that other embodiments may be utilized to practice the present invention and structural and functional changes may be made thereto without departing from the scope of the present invention.

A barn system that provides control of the environment inside a closed barn is illustrated in FIGS. 1-5 and is indicated generally by the numeral 1. Barn system 1 includes enclosed barn 2 on grade 3 having front wall 10, rear wall 12 and a pair of opposed side walls 16 extending between front wall 10 and rear wall 12. Roof 80, which has a ridge 84, covers barn 2. A number of cows 4 are housed inside barn 2. Floor 60 of barn 2 is divided into a feed truck lane 70, composting bed packs 62, and cow feeding lanes 68. Stanchions 64 are arrayed along the feeding lanes 68 so that the cows line up to be fed. A composting bed pack 62 or conventional free stall areas may be included on parts of floor 60. A number of water troughs 66 provide drinking water for the cows.

Front wall 10 and rear wall 12 include a number of roll-up doors 14 to provide access for feeding trucks, equipment, and individuals. Front wall 10 and rear wall 12 are constructed in accordance with known conventional barn walls.

Figure 3:
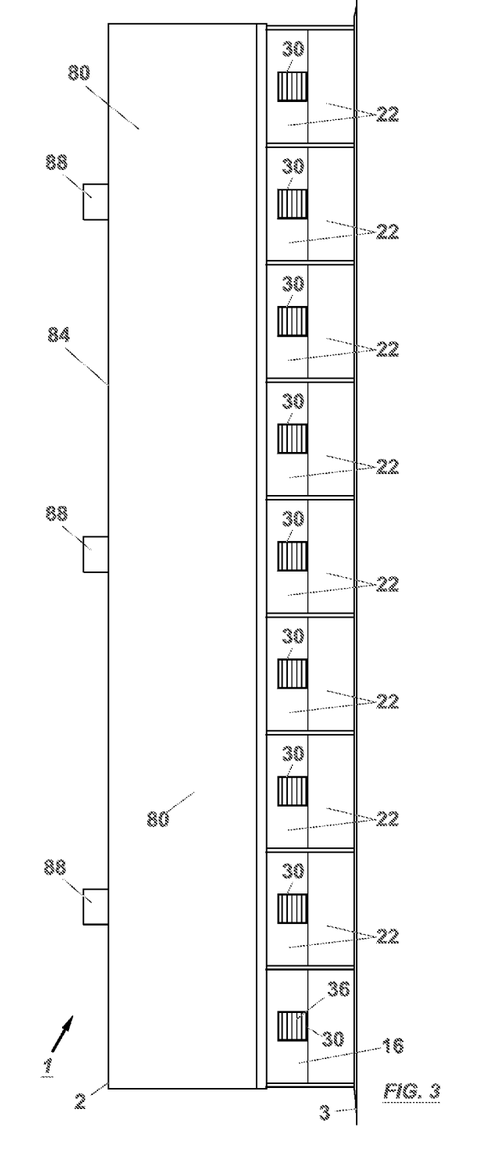
FIG. 3 illustrates a side view of an exemplary barn system in accordance with the present invention.
Figure 3A:
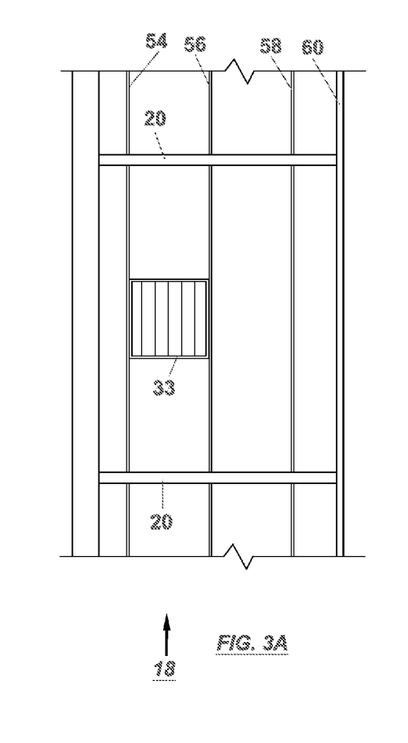
FIG. 3A illustrates a partial sectional view of the side wall framing.

Side walls 16 each include frame 18 on which are mounted a bank of side wall fans 30, which blow air into barn 2 in response to control signals, as will be discussed later. Each side wall fan includes a set of louvers 36, which may be closed or opened as appropriate for operations. FIG. 3A illustrates a partial sectional view showing frame 18, which includes upper frame element 54, intermediate frame element 56, and lower frame element 58 connected to columns 20. Each side wall fan 30 is mounted to upper frame element 54 and intermediate frame element 56. Frame elements 54, 56, and 58 are constructed of conventional materials used in the construction of barns.

Side walls 16 include a number of curtains 22. Curtains 22 on each side wall 16 may be raised and lowered by means of a chain drive system 24 to provide natural ventilation from outside air as system 1 requires. Curtains 22 are moved in response to changes in conditions inside and outside of barn 2, as will be discussed. The number of curtains 22 may vary depending on the design parameters at the barn site; some of the curtains will include an opening to accommodate a side wall fan 30.

Each side wall fan 30 is located near a mister 38, which provides moisture as appropriate to adjust the condition of the environment inside of barn 2. Each fan 30 and mister 38 is used in conjunction with an evaporation tube 39. Each evaporation tube 39 is mounted over a side wall fan shroud, which directs air flow down the inside of the tube 39. The misters 38 are mounted in the evaporation tube 39 within the air flow. This configuration allows maximum air to mist contact time, which enhances evaporation. The evaporation tube 39 is perforated with a number of openings which direct wet air down over the cows. This configuration solves a problem of the mist settling down to the bedding and getting it wet, which is a big problem.

A key feature of system 1 is the inclusion of interior circulation fans 44, which are located along cow feeding lanes 68. Each interior circulation fan is associated with a mister 50, which provides moisture as appropriate and is of a conventional design, which is well-known in the art.

Misters 50, for the interior circulation fans 44, and misters 38, for side wall fans 30, are linked by mist water distribution header 40.

Figure 5:
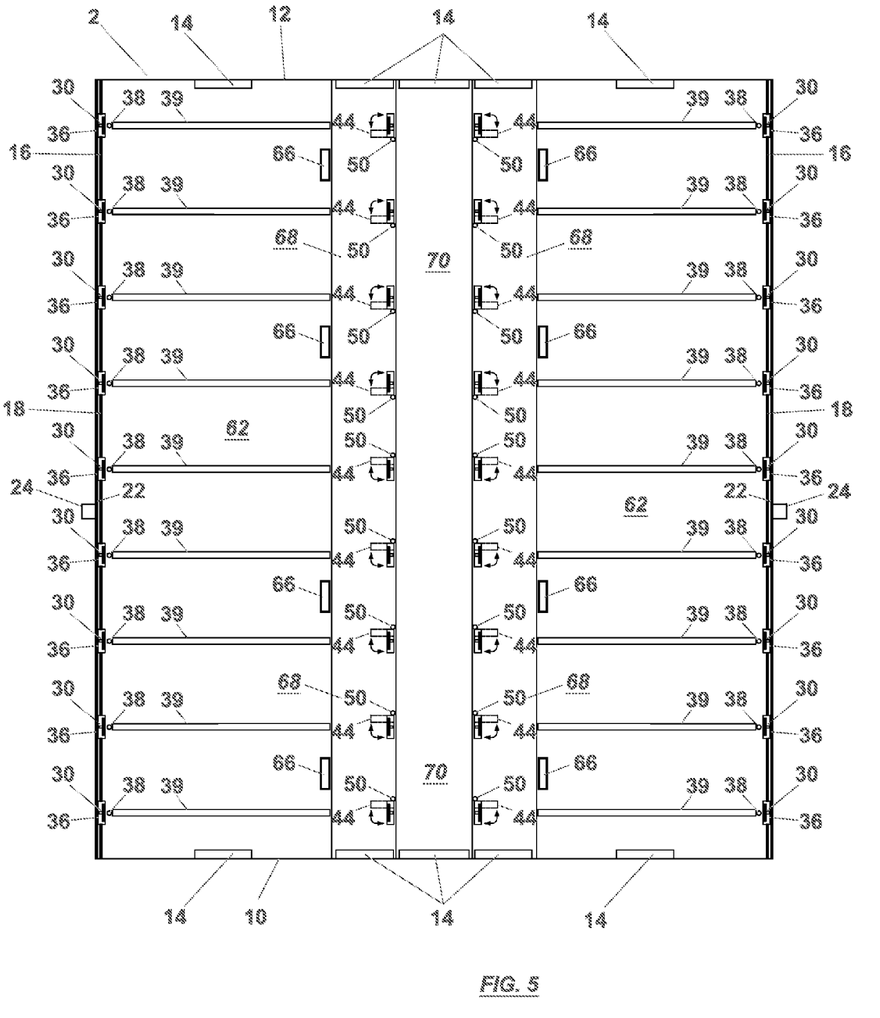
FIG. 5 illustrates a plan cross sectional view of an exemplary barn system in accordance with the present invention.

Interior circulation fans 44 include features that provide substantial benefits to the improving the environment inside barn 2 and significant advantages over conventional barn designs. FIG. 5 illustrates that each interior circulation fan 44 is of the oscillating type that can sweep through a horizontal arc (indicated by broken lines and arrows) that improves the circulation of air flowing inside barn 2. This has the benefit of creating more uniform conditions inside barn 2, thus encouraging the cows not to stand in a single, desired location and move around. This type of operation represents a substantial improvement over fans used in conventional barns, which are not the oscillating type.

Figure 5A:
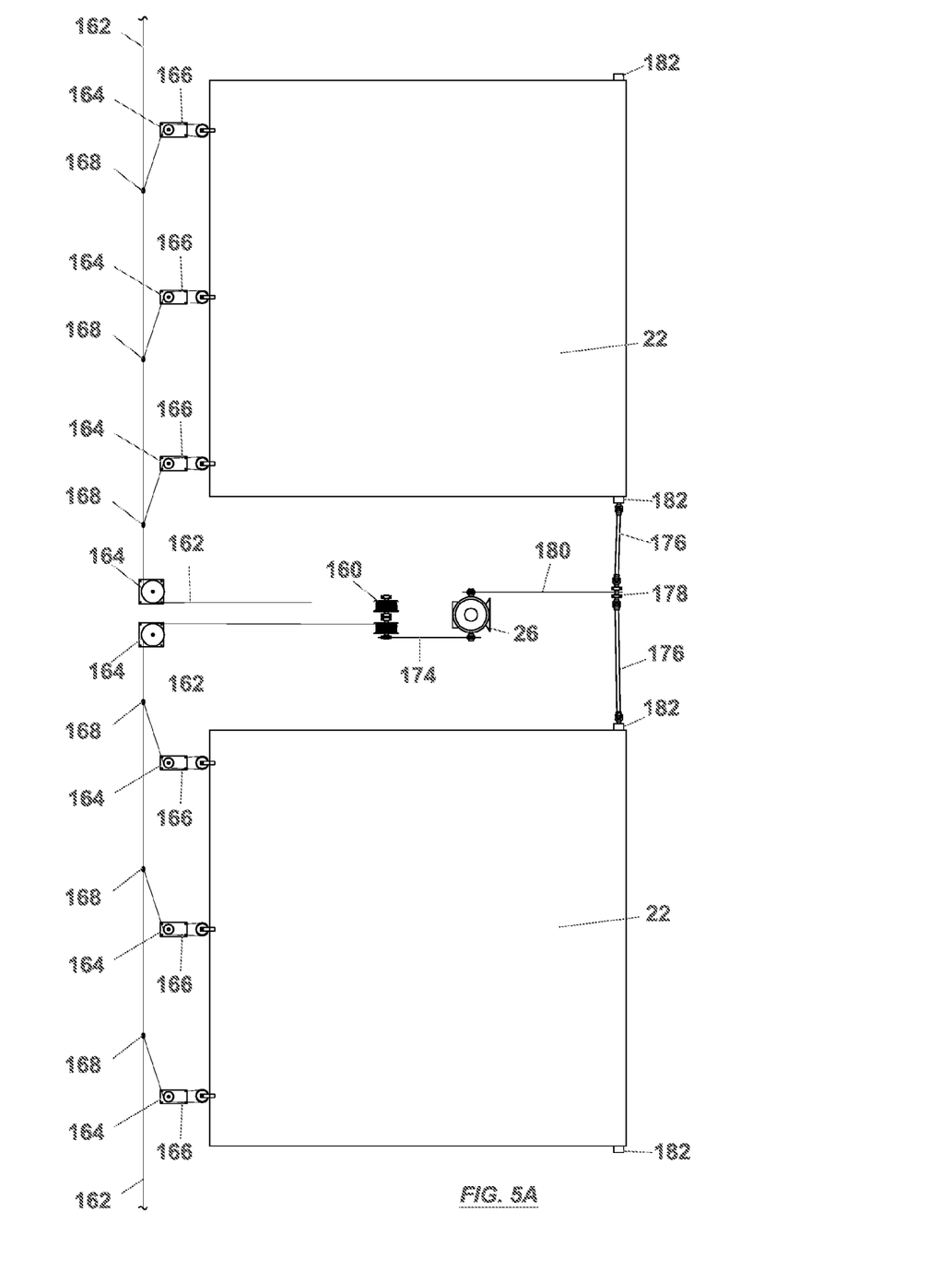
FIG. 5A illustrates a detailed view of the chain drive system of the side wall curtains.

FIG. 5A illustrates an example of a chain drive system 24 mounted on a side wall 16 for raising and lowering curtains 22. A tapered cable drum 160 is used for rolling and unrolling main cable 162 in accordance with system requirements. Main cable 162 and curtain cables 166 are mounted on a number of pulleys 164 to provide for smooth and controlled cable movement. A number of cable clamps 168 are provided to provide close control of the movement of the cables. Motor 26 is used for movement of chain 174, which controls movement of main cable 162. As main cable 162 is rolled up or unrolled, it causes curtains 22 to pull up or drop down. Flex drive 174, which is driven by a combination of sprocket and bearing assembly 178 and chain 180 mounted to motor 26 cause curtain roll tubes 182 to turn and roll the curtains up as a curtain drops or unroll as the curtain rises. One advantage of the use of a tapered cable drum 160 over other configurations of cable drums is that a tapered cable drum helps to better coordinate the rate of drop or lift of curtains 2 with the increase or decrease of the diameter of the curtain roll tube 182. As the diameter of a rolled curtain increases, each revolution of the roll tubes 182 requires more curtain material.

Figure 1:
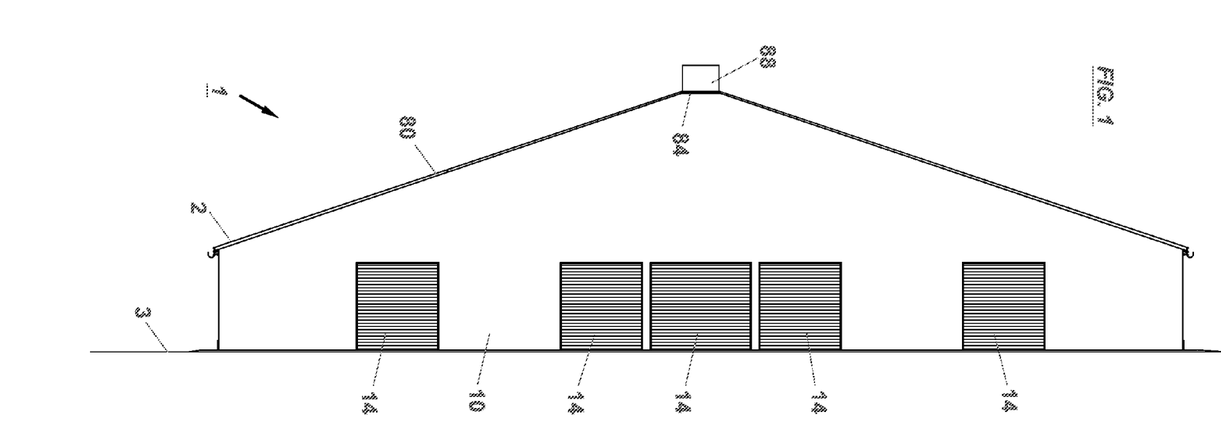
FIG. 1 illustrates a front elevation view of an exemplary barn system in accordance with the present invention.
Figure 2:
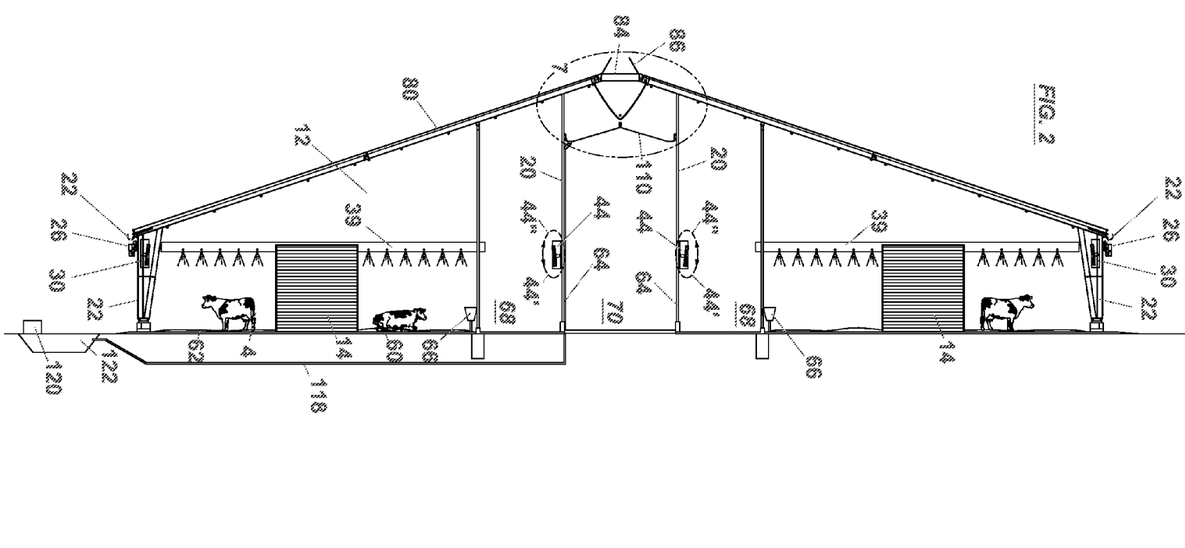
FIG. 2 illustrates a front cross sectional view of an exemplary barn system in accordance with the present invention.

FIG. 2 illustrates another distinctive advantage provided to system 1 by interior circulation fans 44. Each fan 44 is configured to be adjusted upwardly or downwardly through an angle from the horizontal. During the warm summer months, each fan 44 may be set at a downward angle between five and 10 degrees below horizontal, as indicated by fan position 44', and the air flow from the fans is directed at the cows to provide better cooling. During the winter months, each fan 44 may be oriented at an angle of between five and ten degrees above horizontal, as indicated by fan position 44", where the air flow from the fan is directed more toward the roof to provide better heating and preventing condensation on the cold roof.

Roof 80 includes a number of exhaust fans 88 located on ridge 84. The number of exhaust fans 88 will depend on design parameters and conditions at the barn site. Thus, air blown in through side wall fans 30 and interior circulation fans 44 are exhausted upwards through exhaust fans 88, which means that air from the side wall fans travel a shorter distance than the air in conventional barn designs, meaning that the air in barn 2 tends to be of a better quality than in conventional barns. Depending on conditions, not all of the exhaust fans 88 may have to be operated at one time.

Figure 4:
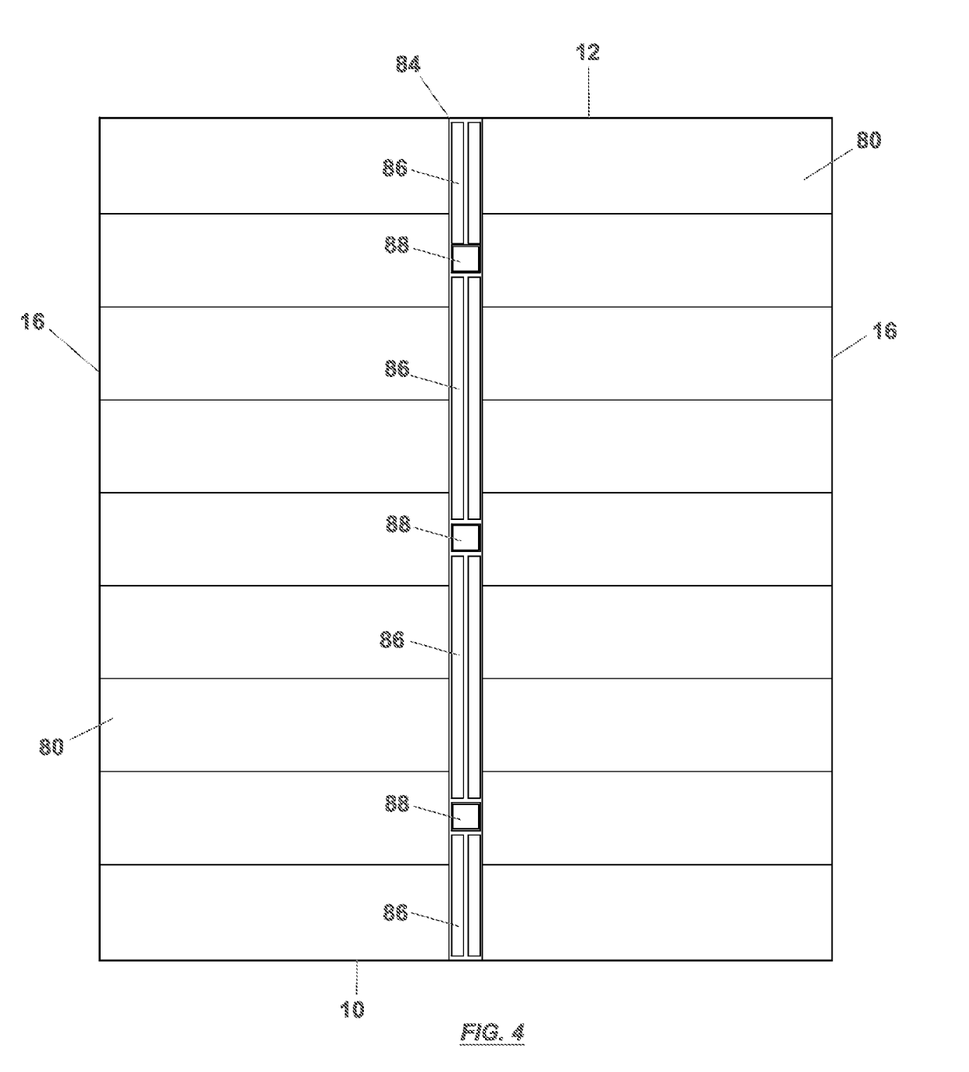
FIG. 4 illustrates a plan view of an exemplary barn system in accordance with the present invention.

Alternatively, a positive pressure design with a naturally induced convection and/or by air blown into barn 2 through the side wall fans 30 will tend to make the air inside barn 2 move upwards toward roof 80 and out through a number of operable ridge vents 86, as shown in FIG. 4. The number of ridge vents 86 may vary depending on design parameters and site conditions. In either case, this represents a substantial improvement to the air in barn 2 over the air in conventional barns. Roof 80 of barn system 1 according to the present invention is preferably constructed of polyethylene fabric that reflects more heat than a conventional metal building material while allowing infiltration of natural light into the barn interior to provide a healthier environment.

Figure 6:
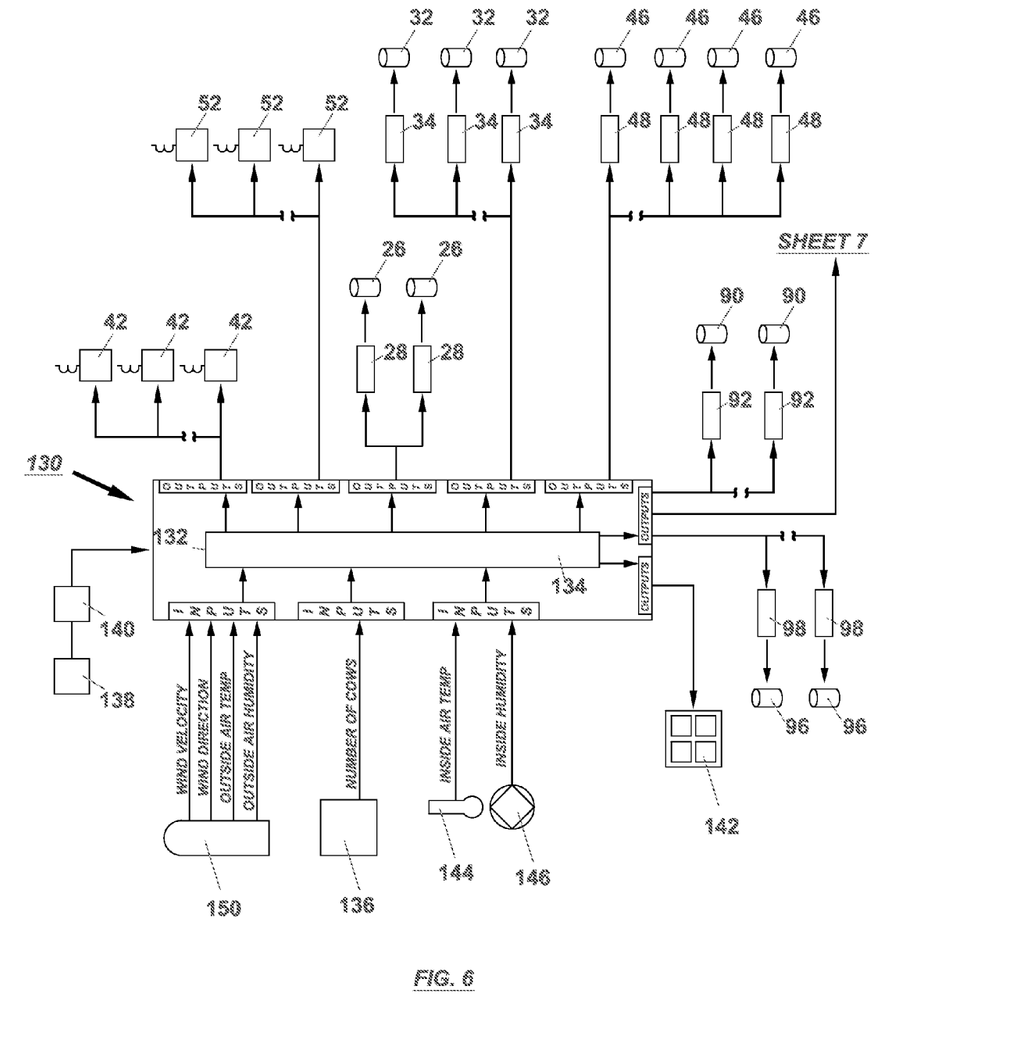
FIGS. 6 and 6A illustrate a schematic diagram of a monitoring and control system for use with an exemplary barn system in accordance with the present invention.
Figure 6A:
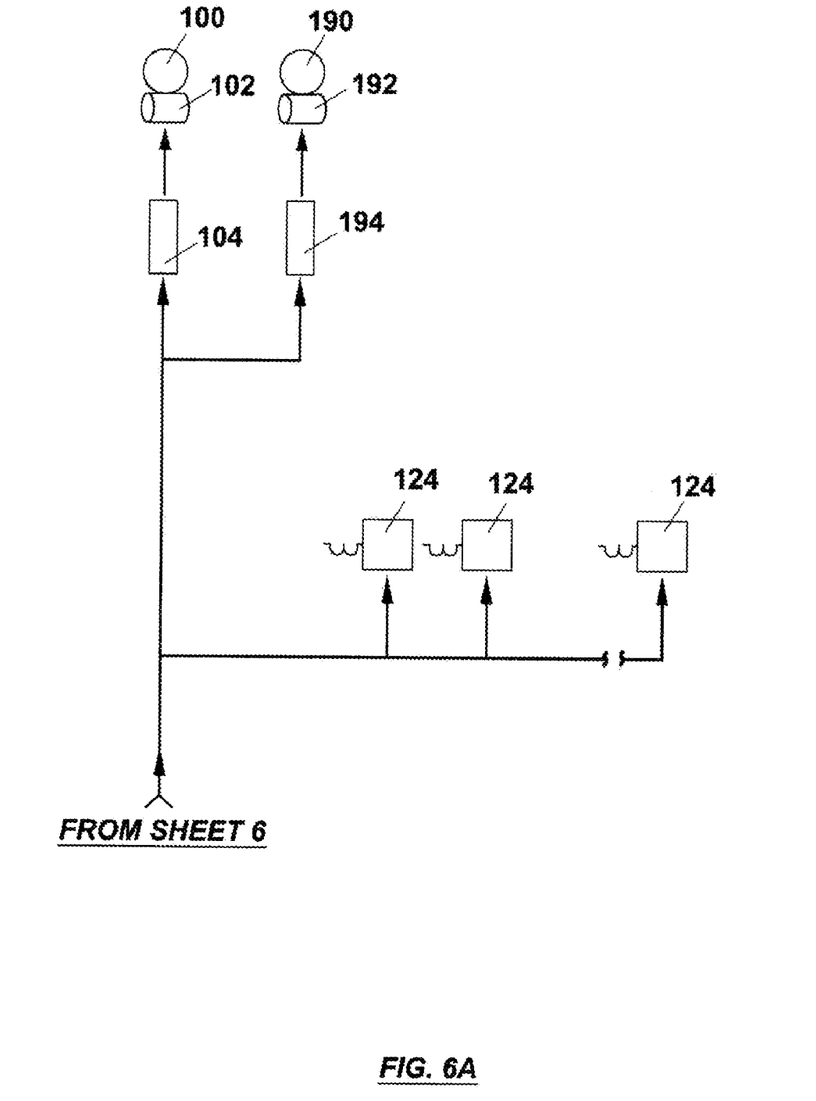

The environment inside barn 2 is closely controlled by monitoring conditions inside and outside of barn 2. To the best of the inventor's knowledge, no cattle barn system design takes into account conditions outside of the barn when trying to control the environment inside of a barn. FIG. 6 illustrates a logic diagram of an electronic control and monitoring system 130 that controls the side wall fans 30, side wall curtains 22, misters 38, interior circulation fans 44, misters 50, operable ridge vents 86, and exhaust fans 88 to provide the best possible conditions inside of barn 2.

In the preferred embodiment of the invention, control and monitoring system 130 includes programmable logic controller 132, in which is embedded control program 134, which controls all of the preprogrammed commands to control fans, curtains, misters, ridge vents and exhaust fans. Control and monitoring system 130 is powered by power source 140 and activated by power switch 138, which may be a pushbutton or a key switch. The operator of system 130 may observe conditions and provide commands at operator panel 136 or annunicator panel 142.

Temperature and relative humidity of the air inside barn 2 are monitored by thermometer 144 and humidistat 146. In the preferred embodiment of the invention, weather station 150 monitors conditions outside barn 2 and provides information concerning wind velocity, wind direction, outside air temperature, and outside air relative humidity. In response to the information concerning conditions both inside and outside of barn 2, monitoring and control system 130 may activate or deactivate one or more solenoid valves 42 associated with misters 38 and one or more solenoid valves 52 associated with misters 50 to increase or decrease the moisture in the air inside barn 2.

Monitoring and control system 130 also controls the on/off status of side wall fans 30 and interior circulation fans 44. Each side wall fan 30 includes a motor 32 and a motor starter 34, while each interior circulation fan 44 includes a motor 46 and a motor starter 48. As conditions inside barn 2 require, monitoring and control system 130 provides signals to the requisite number of motor starters 48 and 34 to start or stop motors 32 and 46 so that the correct number of fans 44 and 30 are operating to maintain the required conditions inside barn 2. Similarly, as conditions inside barn 2 require, monitoring and control system 130 provides signals to the requisite number of motor starters 92 and 98 to start or stop motors 90 and 96 so that the correct number of exhaust fans 88 and ridge vents 86 are properly operating to maintain the required conditions inside barn 2.

Monitoring and control system 130 also controls the position of curtains 22, which will depend on the conditions desired inside barn 2. Curtains 22 are raised and lowered by chain drive systems 24, which are driven by motors 26, preferably gear motors. Monitoring and control system 130, in response to the desired conditions inside of barn 2 can command motor starters 28 to cause motors 26 to activate and/or deactivate, thereby raising or lowering curtains 22 as desired to optimize conditions inside barn 2.

Another advantage provided by system 1 according to the present invention over conventional barn designs is that the air from inside the barn is exhausted through the roof, rather than through the sides. This makes the quality of the exhaust air from barn 2 better than the quality of the exhaust air from barns of conventional designs. Also, with the roof exhaust designs, problems associated with pressure from headwinds are minimized.

As previously mentioned, in some jurisdictions, the emissions from barns are governed by very strict requirements that require some cleanup of the exhaust gases. Exhaust gases from barns housing livestock usually contain a large amount of volatile organic compounds, or VOC's that come from the cows, manure, feed, respiration, and digestive gases from the livestock. Conventional industrial scrubber systems are generally not configured to economically provide adequate cleanup for the large amount of exhaust gases exiting from a barn.

Figure 7:
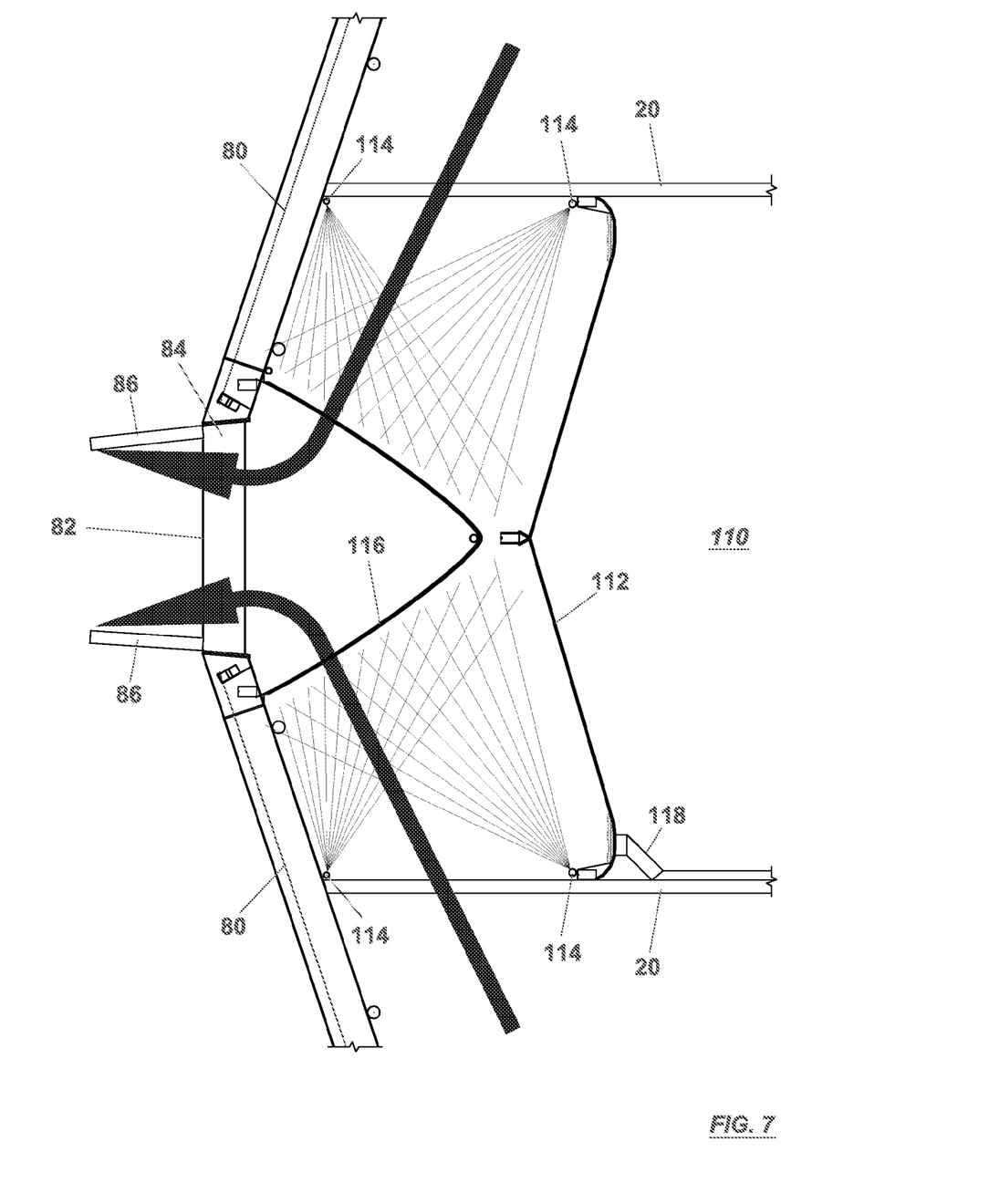
FIG. 7 illustrates a sectional view taken at circle 7 in FIG. 2.
Figure 7A:
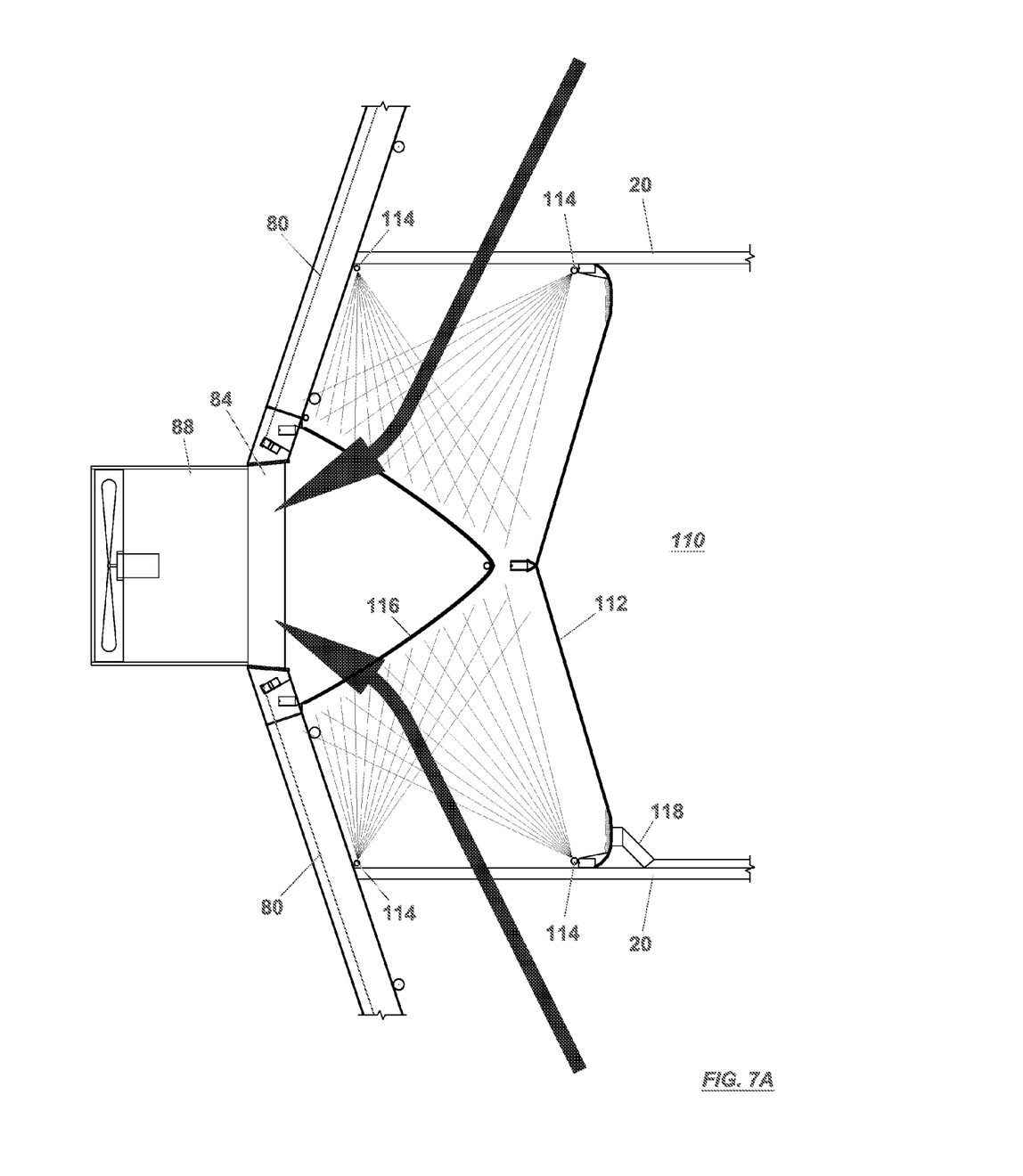
FIG. 7A illustrates an alternative configuration to that shown in FIG. 7.

FIGS. 7 and 7A illustrate a scrubber system that may be mounted near the roof 80 of barn 2 that provides cleanup of exhaust gases that bring the emission levels to within strict standards where required. The scrubber systems illustrated in FIGS. 7 and 7A are mounted along and under the roof ridge 84. FIG. 7 shows exhaust through a scrubber 110 without the requirement of an exhaust fan, instead depending on the natural convection effect that causes the warmer gasses to move towards the roof and/or the pressure from the side wall fans 30 to force air through operable ridge vents 86. In the configuration illustrated in FIG. 7, scrubber 110 includes a catch pan 112 for collecting spray water emitted from misting pipes 114. Normally, to effectively remove VOC's from a gas, the spray must provide for a minimum of five seconds of contact time with the exhaust gasses. In the scrubber design according to the present invention, contact time is increased to about twelve seconds, providing a more effective means of cleaning the gases.

Filter material 116 prevents moisture from passing out of barn 2. As illustrated in FIG. 7, after passing through filter material 116, the gases blow out of ridge opening 82 by opening ridge vents 86. As illustrated in FIG. 7A, alternatively, the gases from barn 2 pass through scrubber 110 through one or more exhaust fans 88. It should be noted that depending on existing conditions and the amount of air flow, only a portion of scrubber 110 may have to be used at one time. Scrubber 110 extends for most of the length of roof ridge 84, but may be used in sections.

If scrubber 110 is required to mitigate air quality, spray water pumping would become the major ongoing operating cost. During summer, when massive volumes of air movement through barn 2 is required, all operable ridge vents 86 and maximum pumping for the misting pipes will be required. During the winter months when a minimum of air movement through barn 2 is required, only a fraction of ridge vents 86 and minimal water pumping for the misting pipes will be required to create a spray shield for the exhaust gases exiting barn 2. There would thus be a cost savings from such a configuration because of less equipment wear and electrical power costs.

If scrubber 110 is included in the system 1, the spray water will be controlled by monitoring and control system 130, as shown in FIG. 6. Because of the large differences in the need for spray water volume between the hottest months and the coolest months, a large volume pump 100 and a small volume pump 190 are included in the system components. Depending on the volume of gases exiting barn 2, monitoring and control system 130 can command motor starter 104 on pump 102 of large volume pump 100 and/or motor starter 194 on motor 192 of small volume pump 190 activate and/or deactivate. Monitoring and control system 130 may also activate or deactivate one or more solenoid valves 124 associated with mister pipes 114 of scrubber 110.

Another feature of system 1 is the cleanup and reuse of the spray water which has been contaminated with VOC's. The contaminated spray is collected in catch pan 116 and conveyed to reservoir 122 outside of barn 2 (see FIG. 1).

Figure 8:
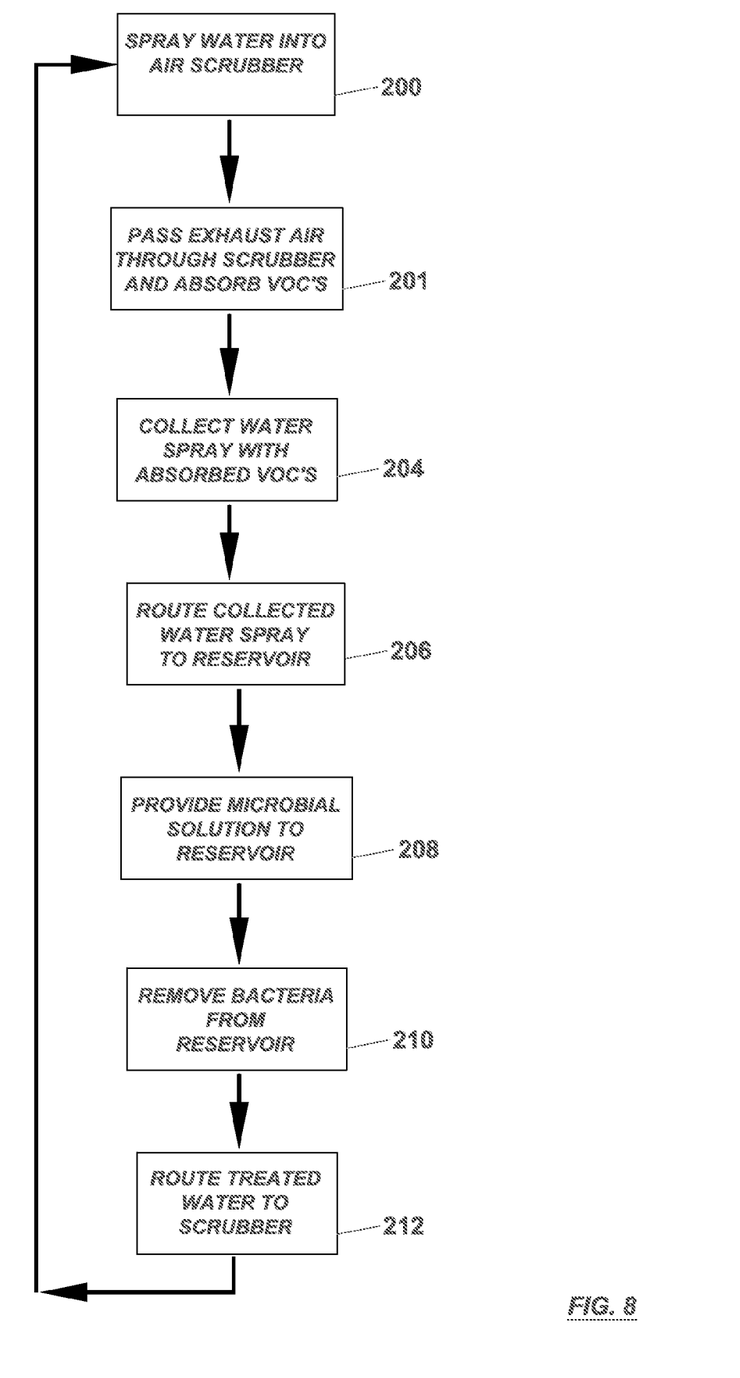
FIG. 8 is a block flow diagram illustrating the cleanup cycle of the sprinkling water used in the scrubber for use with an exemplary barn system in accordance with the present invention.
Figure 9A:
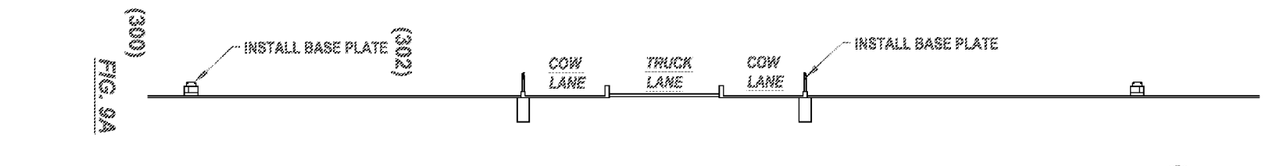
FIGS. 9A-9D illustrate a sequential view of the erection of a section of an exemplary barn system in accordance with the present invention.
Figure 9B:
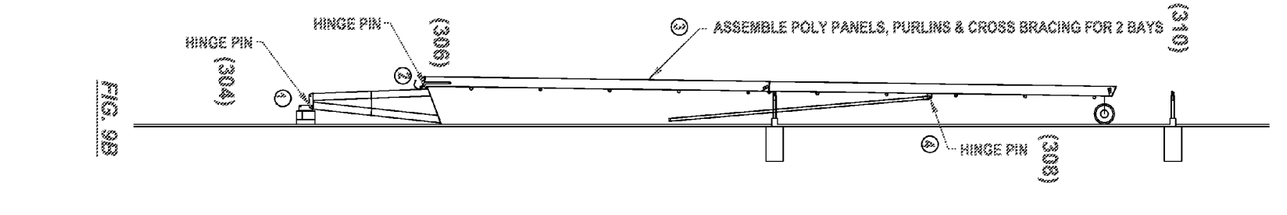
Figures 9C, 9D:
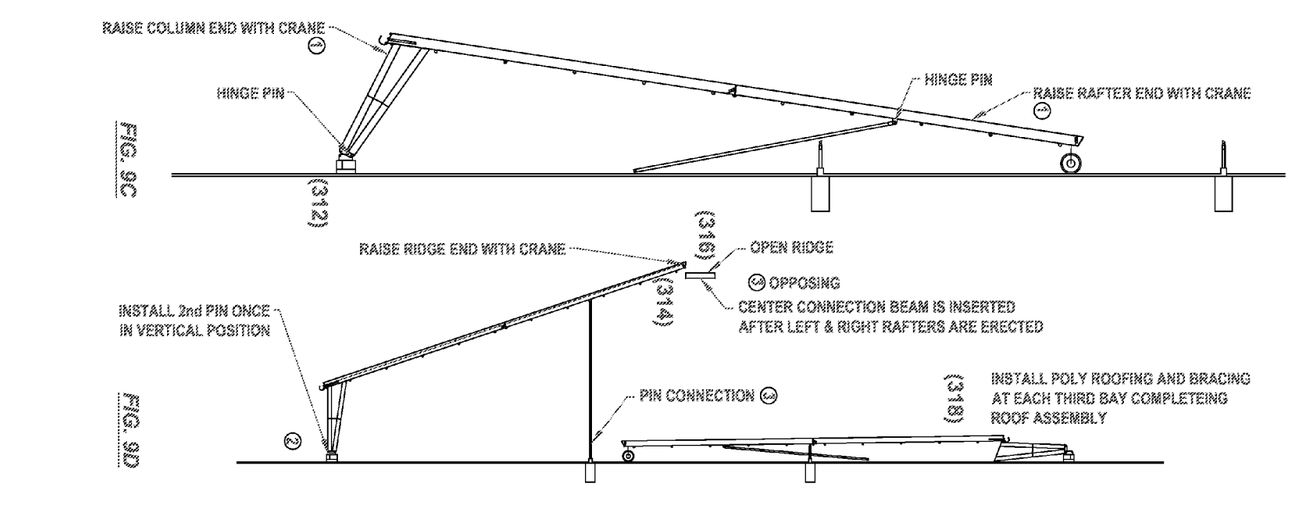

FIG. 8 is a block flow diagram showing the process of treatment and recycle of the spray water. At block 200, water is sprayed by misting pipes into scrubber 110. At block 202, exhaust air is passed through scrubber 110 and VOC's are adsorbed by the water spray. At block 204, the water with adsorbed VOC's is collected. At block 206, the collected water spray is routed to reservoir 122.

At block 208, reservoir 122 is inoculated with a microbial solution containing speciated bacteria that have the ability to consume the VOC's as food. At block 210, the bacteria with the VOC's are removed from the reservoir. At block 212, the cleaned water is recycled back to the ridge vent scrubber 110 to the sprinkling system by return line 118. This feature provides for economic use of a valuable resource, water, by recycling it for continual use in the scrubber.

Barn 2 also provides a unique design for construction and a field erection method that provides significant savings over conventional barns. The design is illustrated in FIGS. 9A-9D and the method of erection illustrated in the block flow diagram of FIG. 10. The components of barn 2 are designed to be assembled at ground level, and then to be pulled and lifted into their erected positions. This method allows for significant labor savings, due to the fact that only about one-third of the total labor required for assembly of barn components is at the finished roof elevation. Labor at the finished roof elevation can be quite expensive. It should be noted that the small numbers in the circles shown on FIGS. 9A-9D indicate the order of the steps shown in each individual figure.

Figure 10:
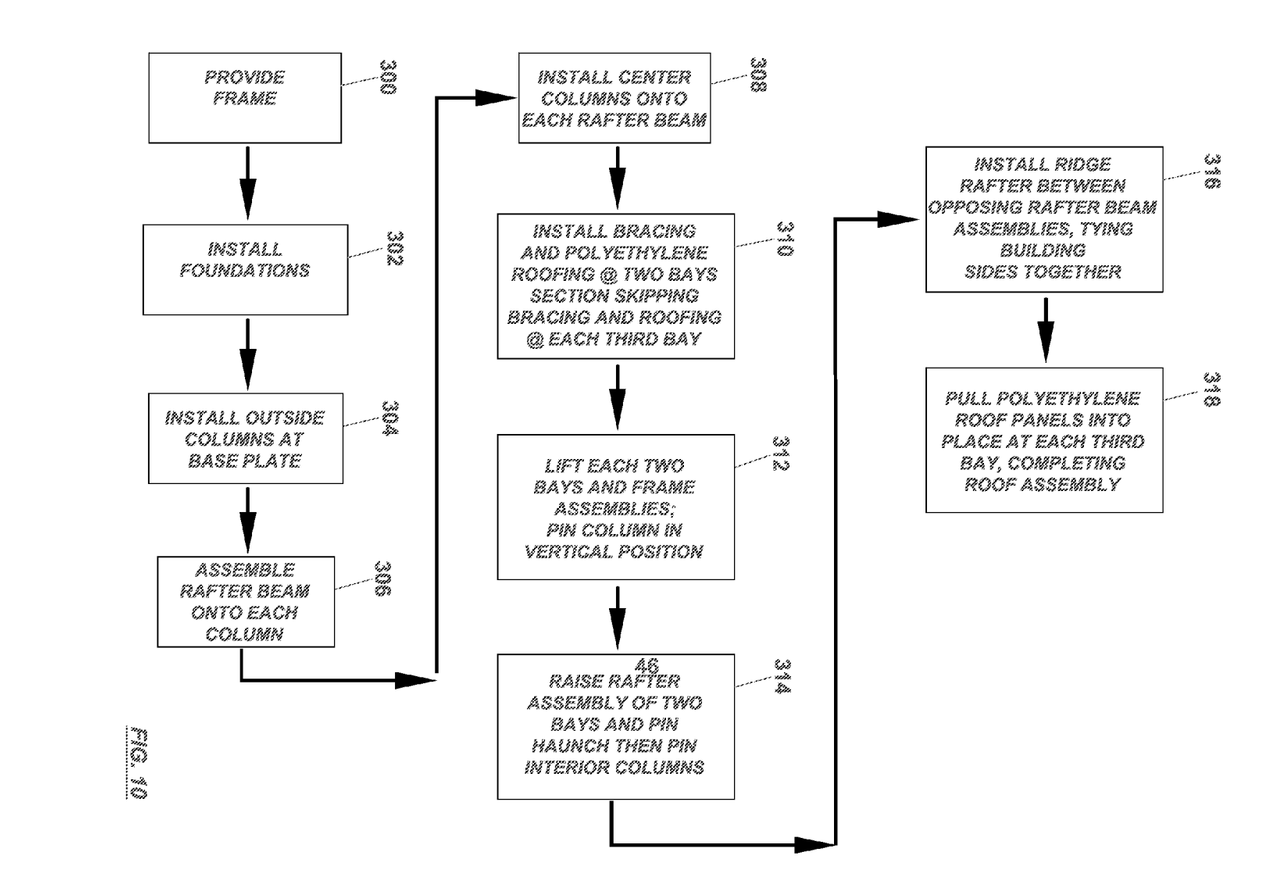
FIG. 10 illustrates a block flow diagram of the erection process of an exemplary barn system in accordance with the present invention.

With reference to FIG. 10, the method of erection will now be described. At block 300, each building frame is provided with four footings. Each frame has six hinge point column connections. Two of the hinge points connections are at the base of the outside columns, two are at the interior columns where they connect to the rafters, and two of the hinge points are at the tops of the outside columns where they connect to the rafters.

At block 302, the outside column hinge point footing at each of the outside columns, and one pin footing at each of the two interior columns are installed as the foundation.

At block 304, the outside columns are installed at the base plate with hinge pins.

At block 306, a rafter beam is assembled onto each column. At block 308, the center columns are installed onto each rafter beam. At block 310, the bracing and polyethylene roofing are installed on a two bays section, while skipping the bracing and roofing at each third bay.

At block 312, each two bay section and frame assembly are lifted and the corresponding column is pinned in a vertical position. At block 314, the rafter assembly of each two bays section is raised and the haunch and interior columns are pinned.

At block 316, the ridge rafter between two opposing rafter beam assemblies is installed, tying the building sides together. At block 318, the polyethylene roof panels are pulled into place, completing the roof assembly.

At this point, the basic barn 2 is now assembled. There are other components connected to barn 2 that are similar to those used in conventional barn designs and are not unique to the erection method herein described.

The foregoing description of an exemplary embodiment of the present invention has been presented for purposes of enablement, illustration, and description. It is not intended to be exhaustive of or to limit the present invention to the precise form discussed. There may be, however, other barn systems not specifically described herein, but with which the present invention is applicable. The present invention should therefore not be seen as limited to the particular embodiment described herein; rather, it should be understood that the present invention has wide applicability with respect to barn systems. Such other configurations can be achieved by those skilled in the art in view of the description herein. Accordingly, the scope of the invention is defined by the following claims.

What is claimed is:

1. A system for providing control of the environment in an enclosed barn to provide comfort for farm animals in the barn, the system comprising:
    a front wall and an opposed rear wall;
    a pair of opposed side walls extending between said front and rear walls;
    a floor contained within said walls;
    a plurality of feeding lanes on said floor;
    a roof connected to and covering said walls and said floor;
    one or more sets of operable ridge vents mounted on said roof;
    one or more exhaust fans mounted on said roof;
    a plurality of fans mounted in said side walls said fans providing outside air to said enclosed barn; and
    a plurality of interior circulation oscillating fans arrayed inside said barn adjacent said feeding lanes,
    wherein each of said side wall fans and said interior circulation fans include misters,
    whereby, outside air provided by said fans is exhausted through said roof.

2. The system according to claim 1, further including an evaporation tube enclosing each of said misters adjacent said side wall fans, said misters mounted in air flowing from said side wall fans and directed towards said farm animals.

3. The system according to claim 2, wherein said interior circulation fans may be tilted up to 10 degrees upward or downward from horizontal to adjust for seasonal changes.

4. The system according to claim 1, wherein each of said side walls are comprised of a plurality of curtains mounted on said side walls, said curtains movable between a fully open position and a fully closed position.

5. The system according to claim 4, wherein said curtains are moved by a motor-driven chain drive system.

6. The system according to claim 4, wherein said curtains are constructed of fabric.

7. The system according to claim 4, further including an electronic monitoring and control system comprising:
    a programmable logic controller; and
    a software program embedded in said programmable logic controller controlling the side wall fans, the interior circulating fans, the misters, the curtains, the operable ridge vents and exhaust fans in accordance with the program.

8. The system according to claim 7, further comprising a weather station outside of and adjacent the barn to monitor weather conditions outside the barn.

9. The system according to claim 8, wherein said electronic monitoring and control system monitors:
    air temperature outside the barn;
    relative humidity of the air outside of the barn;
    wind velocity outside the barn; and
    wind direction outside the barn.

10. The system according to claim 1, wherein said roof is constructed of polyethylene fabric.

* * * * *